US010789789B1

(12) United States Patent
Edman

(10) Patent No.: US 10,789,789 B1
(45) Date of Patent: Sep. 29, 2020

(54) ENHANCED CARGO AND VEHICLE MONITORING

(71) Applicant: Alarm.com Incorporated, Tysons, VA (US)

(72) Inventor: Kara Edman, Alexandria, VA (US)

(73) Assignee: Alarm.com Incorporated, Tysons, VA (US)

(*) Notice: Subject to any disclaimer, the term of this patent is extended or adjusted under 35 U.S.C. 154(b) by 91 days.

(21) Appl. No.: 16/232,773

(22) Filed: Dec. 26, 2018

Related U.S. Application Data

(60) Provisional application No. 62/610,412, filed on Dec. 26, 2017.

(51) Int. Cl.
| *G01C 23/00* | (2006.01) |
| *G07C 5/08* | (2006.01) |
| *H04Q 9/00* | (2006.01) |
| *G05D 1/12* | (2006.01) |
| *G05D 1/00* | (2006.01) |
| *G07C 5/00* | (2006.01) |
| *B64C 39/02* | (2006.01) |
| *G01C 21/34* | (2006.01) |
| *G05D 1/10* | (2006.01) |

(52) U.S. Cl.
CPC .......... *G07C 5/0808* (2013.01); *B64C 39/024* (2013.01); *G01C 21/3407* (2013.01); *G05D 1/0094* (2013.01); *G05D 1/12* (2013.01); *G07C 5/008* (2013.01); *H04Q 9/00* (2013.01); *B64C 2201/127* (2013.01); *G05D 1/101* (2013.01); *H04Q 2209/40* (2013.01)

(58) Field of Classification Search
CPC combination set(s) only.
See application file for complete search history.

(56) References Cited

U.S. PATENT DOCUMENTS

| 5,917,433 | A | 6/1999 | Keillor et al. | |
| 2004/0130442 | A1* | 7/2004 | Breed | G02B 27/01 340/443 |
| 2005/0273218 | A1* | 12/2005 | Breed | B60R 21/20 701/2 |
| 2010/0182431 | A1 | 7/2010 | Pansegrouw | |
| 2017/0092109 | A1 | 3/2017 | Trundle et al. | |

FOREIGN PATENT DOCUMENTS

WO   WO2004095392   11/2004

* cited by examiner

Primary Examiner — Adam M Alharbi
(74) Attorney, Agent, or Firm — Fish & Richardson P.C.

(57) ABSTRACT

A monitoring system is configured to monitor a vehicle and perform the action of receiving first sensor data that reflects an environmental condition in the vehicle. The monitoring system is configured to perform the action of determining that the environmental condition in the vehicle satisfies an environmental condition threshold. The monitoring system is configured to perform the action of, based on determining that environmental condition in the vehicle satisfies an environmental condition threshold, identifying, by the monitoring system, a second sensor that is located on a travel path of the vehicle. The monitoring system is configured to perform the action of transmitting, to the second sensor, instructions to capture second sensor data that is associated with the vehicle. The monitoring system is configured to perform the action of receiving, from the second sensor, the second sensor data.

20 Claims, 5 Drawing Sheets ately transmit, and at t be monitoring cally locate its monitoring includes a first that is reflects an environmental condition in the vehicle; a location sensor that is configured to generate location data that reflects a geographical location of the vehicle; a processor that is configured to receive the first sensor data and the location data; determine that the environmental condition in the vehicle satisfies an environmental condition threshold; and, based on determining that environmental condition in the vehicle satisfies an environmental condition threshold, transmit, to a monitoring server, data indicating the location of the vehicle and the environmental condition in the vehicle; and the monitoring server that is configured to receive the data indicating the location of the vehicle and the environmental condition in the vehicle; based on the location of the vehicle and the environmental condition in the vehicle, identify a second sensor that is located on a travel path of the vehicle; transmit, to the second sensor, instructions to capture second sensor data that is associated with the vehicle; receive, from the second sensor, the second sensor data; and based on the second sensor data, perform a monitoring system action.

This implementation and other implementation may include one or more of the following optional features. The first sensor is a humidity sensor, thermometer, lock sensor, camera, or microphone. The second sensor is a camera that is configured to capture image data of a property that is located on the travel path of the vehicle. The second sensor is attached to an autonomous drone. The instructions to capture second sensor data that is associated with the vehicle comprise instructions to navigate to a location of the vehicle. The monitoring server is configured to perform the monitoring system action by generating and transmitting a message indicating that environmental condition in the vehicle is within or is outside of a specified environmental condition range. The monitoring server is configured to perform the monitoring system action by generating and transmitting, to an additional vehicle, instructions to configure the additional vehicle for additional environmental conditions of the second sensor. The processor is configured to determine that the environmental condition in the vehicle satisfies an environmental condition threshold by determining that a temperature inside the vehicle is equal to an outdoor temperature. The monitoring server is configured to transmit instructions to capture second sensor data that is associated with the vehicle by transmitting instructions to capture an image of the vehicle; and perform a monitoring system action by generating and transmitting a message that includes the image of the vehicle. The processor is configured to determine that the environmental condition in the vehicle satisfies an environmental condition threshold by determining that a temperature of an inside of the vehicle is equal to an outdoor temperature; capture, using a camera located on the vehicle, an image of the inside of the vehicle; and transmit, to a monitoring server, the image of the inside of the vehicle.

Other implementations include corresponding systems, apparatus, computer-readable storage media, and computer programs configured to implement the actions of the above-noted methods.

The details of one or more implementations are set forth in the accompanying drawings and the description below. Other features and advantages will become apparent from the description, the drawings, and the claims.

ENHANCED CARGO AND VEHICLE MONITORING

CROSS-REFERENCE TO RELATED APPLICATION

This application claims the benefit of U.S. Application No. 62/610,412, filed Dec. 26, 2017, the contents of which are incorporated by reference.

TECHNICAL FIELD

This disclosure generally relates to monitoring systems.

BACKGROUND

Cargo of different types is transported globally through boats, vehicles, trucks, and motorcycles. Often, the cargo is being transported on behalf of a company or organization. However, these organizations have limited ways of monitoring the cargo while en route to a destination.

SUMMARY

This disclosure generally describes systems and methods for monitoring cargo and cargo vehicles.

As described below, the systems and methods allow a vehicle operating company, security company, or company whose cargo is being transported to monitor the cargo and cargo vehicle at various times en route to the destination location. The monitoring may include monitoring environmental conditions such as temperature, light, or humidity in the cargo area where the cargo vehicle is located. The monitoring may also include monitoring when doors are opened and closed, when security is breached, when a cargo vehicle is not on the planned or likely route, when the cargo vehicle suffers from engine failures, security hazards, or weather and traffic hazards.

The systems and methods provide remedies such as controlling various components of the cargo vehicle to rectify or prevent the cargo from further damage or minimizing a security hazard. For example, the HVAC settings may be modified in response to environmental conditions in the cargo area. Images may be captured and reported if a security breach, e.g., unauthorized opening of a cargo door, has occurred. Additional resources, such as drones and cameras, may be deployed, as needed, to monitor the cargo and its delivery.

Because vehicle data is captured and stored in real-time, the vehicle data can be utilized for various advantages. One advantage is that users may have more information regarding the conditions associated with cargo transport. This information allows the user to determine, with a greater degree of confidence, how and when cargo may have been damaged or stolen and under what conditions these events occurred. The information may also allow the user to identify likely perpetrators if their images were captured by the image sensors. Further, a user can be in a better position to appreciate if a driver faced difficulty, e.g., heavy traffic, vehicle breakdown, weather hazards, while transporting the goods, and whether any delivery delays were reasonable. Another advantage is that the systems in a cargo vehicle can operate with greater efficiency and intelligence by relying on data from other sensors and components deployed in the cargo vehicle.

According to an innovative aspect of the subject matter described in this specification a system for monitoring cargo

BRIEF DESCRIPTION OF THE DRAWINGS

Like reference numbers and designation in the various drawings indicate like elements.

DETAILED DESCRIPTION

Although the description in the figures refers to a vehicle such as a truck, the methods and systems described in this specification may be implemented in various types of cargo vehicles such as boats, cars, trucks, vans, bikes, bicycles, planes, or helicopters.

Figure 1:
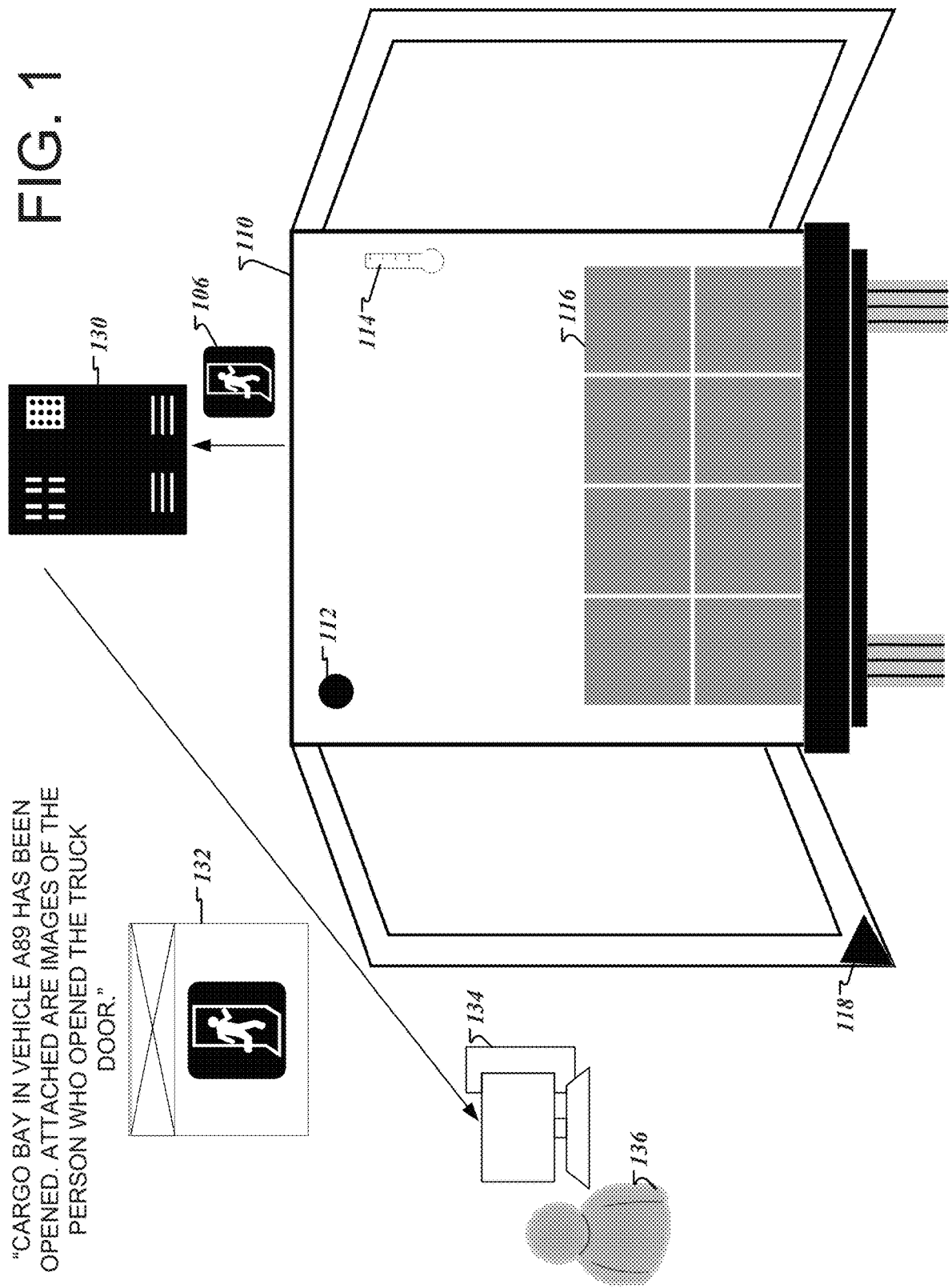
FIG. 1 depicts an example scenario of image sensory data being transmitted to a monitoring system from a vehicle in response to the detection of an event.

FIG. 1 depicts an example scenario of image data being transmitted to a monitoring system from a vehicle 110 in response to the detection of an event. Vehicle 110 may be transporting cargo 116 and may include a plurality of sensors such as an optical sensor 112, a humidity sensor 114, lock sensor 118, and a temperature sensor (not shown). The vehicle 110 may be in constant, real-time communication or periodic communication with a monitoring system that includes a server 130. The monitoring system may communicate with one or more persons 136, including for example, an associate of a goods company on behalf of which the cargo 116 is being transported, an administrator of the monitoring system, an associate of a transportation company, or an associate of a security company.

The sensors in vehicle 110 may monitor the conditions in and around the vehicle 110. For example, the humidity sensor 114 may monitor humidity levels in the cargo area of vehicle 110. The temperature sensor may monitor the temperature in the cargo area of vehicle 110. Additional external sensors such as rain sensors, wind sensors, remote temperature sensors, or humidity sensors may monitor the environmental conditions through which the vehicle 110 is passing. An accelerometer, gyroscope, or global position system (GPS) unit may monitor or track the speed, location, and movement of vehicle 110.

Various types of optical sensors may be utilized as the optical sensor 112. For instance, in some cases, the optical sensor 112 may include a light detector to determine the amount of light in the cargo area of vehicle 110. When the cargo doors are closed, no light may be sensed. When the cargo doors are open, the optical sensor 112 may detect some light. Thus, data from the optical sensors 112 may be indicative of the cargo doors being open or closed. In some cases, the optical sensor 112 may include a camera to capture still or moving images. The camera may be configured to capture images or videos upon the detection of a trigger condition, based on a programmed scheduled, or upon receiving instructions from a vehicle control processor (VCP). The VCP is discussed in more detail with respect to FIG. 2.

Vehicle 110 may also include a lock sensor 118 that detects the status of the cargo doors of vehicle 110. For example, lock sensor 118 may sense when the cargo doors of the vehicle 110 are open, closed, or partially closed.

In the scenario depicted in FIG. 1, the lock sensor 118 may be configured to communicate with other sensors and the VCP in vehicle 110. For example, any time the lock sensor 118 detects the status of cargo doors of vehicle 110 as changing from locked to open or locked to partially locked, the lock sensor 118 may transmit a signal to optical sensor 112 and/or VCP indicating that the cargo doors are open. The optical sensor 112, which includes a camera, is configured to capture an image or initiate recording of a video for a predetermined period of time (e.g., 30 seconds, 60 seconds) in response to receiving a signal from the lock sensor 118 indicating that the cargo doors are open.

If not already positioned in a manner that enables the optical sensor 112 to capture a clear image of the cargo doors, the optical sensor 112 may modify its position, orientation, lens position, focal length, zoom, or any other parameter value and camera component such that the optical sensor 112 can capture an image that provides a clear view of the cargo doors and the areas immediately surrounding the cargo doors. Camera settings for the parameter values and components that need to be set to provide an optimal view may be preprogrammed into the camera and associated with a cargo door mode, in which the camera is primarily configured to obtain images of the cargo doors. The camera may include various other modes and associated settings. For example, the camera may also include a cargo mode, rear mode, or front mode, in which the camera is programmed to capture the optimal view of the cargo, a rear portion of the cargo area in vehicle 110, or a front portion of the cargo area in vehicle 110, respectively.

After positioning itself, the optical sensor 112 records a video or captures one or more images. Image data 106 corresponding to the video or images are sent to VCP, which transmits the image data 106 to the server 130 of a monitoring system. The optical sensor 112 may continue obtaining image data until one or more conditions are satisfied. These conditions may include, but are not limited to, for example, receiving a signal from lock sensor 118 indicating that the cargo doors are now closed, receiving a signal from the VCP indicating that the camera should terminate obtaining image data, expiration of a particular time period (e.g., 30 seconds, 60 seconds), reaching a threshold number of images or vides, and having no more storage space available to store image data.

Server 130 may process image data 106 in several possible ways. In some implementations, server 130 may process the received image data 106 by filtering, digitizing, sharpening, brightening, or performing other image processing techniques to improve the quality of the image data. In some implementations, the server 130 may add the image data 106 to a profile associated with vehicle 110 along with a time stamp of when the data was obtained. In some implementations, the server 130 may add the image data 106 to a profile associated with an organization for which the vehicle 110 is carrying the cargo along with a time stamp of when the data was obtained. In some implementations, the server 130 may transmit a message 132 that includes one or more portions of the image data 132 and contextual data to device 134 associated with the one or more persons 136. The contextual data may include various types of data including one or more of an identification of the vehicle 110, a driver name of the vehicle 110, the latest known location of vehicle 110, a description of the cargo including the type or amount of cargo, a time when the image(s) or video was captured, environmental conditions associated with the vehicle 110. In some cases, the contextual data may include a short description of the images and a reason for sending the message 132, such as "CARGO BAY IN VEHICLE A89 HAS BEEN OPENED. ATTACHED ARE IMAGES OF THE PERSON WHO OPENED THE TRUCK DOOR."

The message 134 provides the one or more persons 136 (referred to hereinafter as "user") with a real-time status update of the vehicle 110 and contextual information as to who opened the cargo doors in vehicle 110. This information may allow the user 136 to make one or more decisions. For example, if the video or image(s) included message 134 depict an unauthorized person opening the cargo doors or cargo being stolen or accidentally dropped from vehicle 110, the user 136 may determine that the security of vehicle 110, its driver, or the cargo in vehicle 110 is being threatened. Accordingly, user 136 may activate an alarm. In other cases, the video or image(s) included in message 134 may depict the driver of vehicle 110 or a cargo officer, a border patrol officer, or a police officer opening the cargo doors to check the cargo. In such instances, the user 136 may elect not to trigger an alarm.

Although FIG. 1 has been described in the context of image data being transmitted from vehicle 110 to user 136 via a monitoring system server 130, various types of data can be sent to user 136 that provide information regarding vehicle 110 to the user 136. For example, data from other sensors in vehicle 110 may indicate conditions, including but not limited to, the environmental conditions in and around vehicle 110, a speed and location of vehicle 110, and cargo conditions in vehicle 110.

Figure 2:
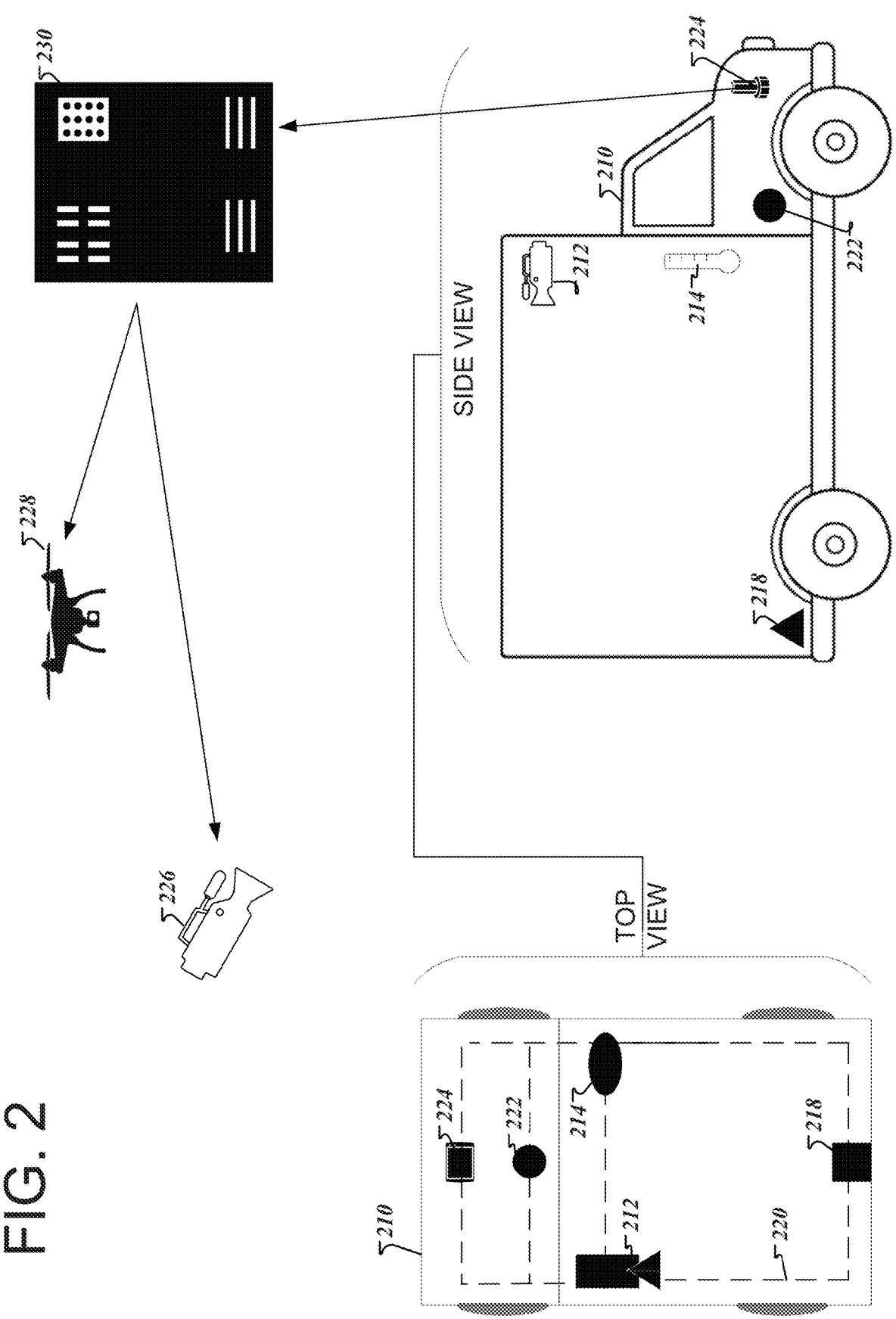
FIG. 2 depicts an example system for monitoring cargo inside and outside a vehicle.

FIG. 2 depicts an example system for monitoring cargo inside and outside a vehicle 210. A top view and side view of vehicle 210 is shown in FIG. 2. Vehicle 210 may include a vehicle control processor (VCP) 222, a transceiver 224, and various internal and external sensors, as described above with reference to FIG. 1. In FIG. 2, the optical sensor 212, humidity sensor 214, and lock sensor 218 are shown. The vehicle 210 may communicate with a server 230 of a monitoring system, which may have one or more resources such as drones 228 and cameras 226.

As shown in the top view of vehicle 210, the VCP 222, transceiver 224, and sensors such as optical sensor 212, humidity sensor 214, and lock sensor 218, may be connected with each other through a network 220. The network may be wireless or wired. Examples of wired networks include, but are not limited to, a fiber optic network, a copper network, or various suitable types of wired networks. Examples of wireless networks include, but are not limited to, Z-wave, Bluetooth, Wi-Fi, Zigbee, and HomePlug networks.

The sensors may communicate with each other directly or through VCP 222. For instance, lock sensor 218 may communicate with optical sensor 212 directly or via the VCP 222. In general, the VCP 222 may be configured to receive and monitor data from various components (e.g., sensors) of vehicle 210 to determine a status of the components in the vehicle 210, and implement commands and operations or to configure a component of vehicle 210 to operate in a particular mode. The VCP 222 may provide status information about a component in the vehicle 210 to server 230 or to another component in vehicle 210.

In some implementations, the operations of one sensor may be conditioned or modified based on data received from another sensor. For example, if a weight sensor is deployed in the cargo area to measure the weight of the cargo being transported, the weight sensor may be deactivated whenever the lock sensor 218 detects that the cargo doors are locked. If the lock sensor 218 detects that the cargo doors are not locked, the weight sensor may be activated to detect any change in weight when the doors are open. As another example, if the temperature in the cargo area exceeds a particular threshold, e.g., 100° F., the humidity sensor may be configured to operate in a higher sensitivity mode and to obtain measurements with greater sensitivity and frequency. By conditioning the operations of sensors based on data received from other sensors, the systems in vehicle 210 are performing smarter and more efficiently.

The VCP 222 may control transceiver 224 to transceive data to and from the monitoring system server 230. The monitoring system may include various resources including server 230, cameras 226, and drones 228. The server 230 may also generate instructions to activate one or more resources in response to the detection of any security event or trigger event and command the resources to execute one or more operations. In some cases, the activation of resources may be done automatically, and, in some cases, the activation may require authorization by a user. The scenarios described below shall provide more detail as to how these resources may be activated in response to data provided from the sensors in vehicle 210.

A. Environmental Monitoring of Cargo

Vehicle 210 may be transporting cargo (e.g., food) that is temperature sensitive or humidity sensitive. Internal temperature sensors or humidity sensors 214 may monitor the temperature and humidity in the cargo area of vehicle 210. External temperature sensors and humidity sensors may monitor the temperature and humidity outside vehicle 210. Rain and snow detectors may also be deployed on an external surface of the vehicle 210.

In some instances, the VCP 222 may be able to determine if the internal temperature and humidity of the vehicle 210 are being affected by the external environmental conditions. For example, the VCP 22 may be able to determine that the presence of snow on the ceiling of vehicle 210 is accompanied with a drop in the temperature and/or humidity in the cargo area inside vehicle 210. In some cases, if the cargo doors have been left open for an extended period of time, the internal temperature sensors or humidity sensors 214 may detect increases or decreases in the temperature and/or humidity in the cargo area inside vehicle 210.

The VCP 222 may be programmed to configure the components of vehicle 210 in response to certain environmental conditions. For example, if the cargo being transported in vehicle 210 must be maintained at 75° Fahrenheit (F) plus or minor 3° F., the VCP 222 may be configured to ensure that the cargo area remains between a lower threshold of 72° F. and an upper threshold of 78° F. Thus, upon receiving data indicating that the temperature in the cargo area is at or below 72° F., the VCP 222 may control the Heating, Ventilation, and Air Conditioning Unit (HVAC) in the cargo area of vehicle 210 to increase the heater power. The increase in heater power may be proportional to the difference between the lower temperature threshold and the current temperature of the cargo area. So if there is a large difference between the current temperature of the cargo area and the lower temperature threshold, the heaters in the cargo unit will emit more heat. If there is a small difference between the current temperature of the cargo area and the lower temperature threshold, the heaters in the cargo unit will emit less heat.

If the VCP 222 receives data indicating that the temperature in the cargo area is at or above 78° F., the VCP 222 may control the HVAC in the cargo area of vehicle 210 to increase the cooling power. The increase in cooling power may be proportional to the difference between the upper temperature threshold and the current temperature of the cargo area. So if there is a large difference between the current temperature of the cargo area and the upper temperature threshold, the air conditioning units in the cargo unit will provide more cooling. If there is a small difference between the current temperature of the cargo area and the upper temperature threshold, the cooling units in the cargo unit will provide less cooling. In general, the VCP 222 will communicate with the HVAC to maintain the temperature of the cargo area in vehicle at approximately 75° F. A record of the temperature in the cargo area from a starting location to a destination location may be stored in vehicle 210 or server 230.

In some implementations, if there is a security or safety event associated with the environmental conditions surrounding the cargo, vehicle 210 may transmit a message to server 230 indicative of the event. For example, if one or more components, such as the engine or the HVAC of vehicle 210 malfunction such that maintaining a temperature of the cargo between the upper and lower thresholds may not be feasible or likely not possible, the VCP 222 may generate a message describing the malfunction and transmit the message to server 230 via transceiver 224. The user may then take one or more actions to limit the damage to the cargo. For example, the user may deploy another vehicle that is located closest to the location of vehicle 210 so that the cargo in vehicle 210 can be moved to the other vehicle as soon as possible with the least amount of damage and subsequently transported to its destination. Another example is that the user may identify a mechanic located within the vicinity of the truck's location and request the mechanic to repair the issue with the vehicle 210. Another example is that a drone may be deployed to deliver a repair kit to the driver to fix the malfunction.

In another example, if the environmental conditions in the cargo area of vehicle 210 are changing such that there is a threat or damage likely to be caused to the cargo and the threat or damage is a result of the cargo door being left open, the VCP 222 may generate an alarm or instruction that is output through vehicle 210's speakers and/or display instructing a driver of vehicle 210 to close the cargo door.

B. Security Monitoring

In some implementations, the VCP 222 may be configured to implement one or more protocols for the safety and security of the cargo and driver of vehicle 210. For example, the VCP 222 may be configured to obtain one or more images of the cargo at various times. These times may include, for example, when all cargo units have been loaded onto vehicle 210, when vehicle 210 starts its engine or terminates the engine, when vehicle 210 is at a particular location, such as a start location, a destination location, or a restricted location, or when a cargo door is open or closed. Accordingly, whenever such a time or condition is reached, the VCP 222 may instruct optical sensor 212 to obtain one or more images. The obtained images may be tagged by VCP 222 with descriptive data such as data indicating a time and location when the image was captured. The image data may be transmitted to server 230. A user, who receives the image data from server 230, may be able to determine if any cargo is missing, and if so, at approximately what time or location, the cargo went missing. Additionally, if the cargo doors were opened by an unauthorized person, an image of the unauthorized person may have been captured by image sensor 212 and sent to the user immediately.

In some implementations, the vehicle and driver interactions may be monitored for security purposes. For example, a GPS unit in vehicle 210 may periodically provide location coordinates to VCP 222, which may direct the transceiver 224 to periodically transmit the vehicle 210's location coordinates to server 230. In some cases, if the location coordinates of vehicle 210 indicate that the vehicle 210 is not on the planned route or located in a restricted zone, the server 230 may activate an alarm operation mode and take one or more actions. In some cases, if the progress of the vehicle 210 is very slow and the vehicle 210 is not moving according to the planned schedule, the server 230 may activate an alarm operation mode.

In some implementations, data from motion sensors, gyroscopes, and accelerometers may be continuously collected. The data from the motion sensors, gyroscopes, and accelerometers may indicate a speed at which vehicle 210 is being driven, how many stops vehicle 210 has made, how many times the driver has gone into or out of vehicle 210, and whether the motion of the vehicle 210 has been erratic, e.g., swerving a lot. This data may also be sent to server 230, and based on this data, the server 230 or a user may determine if there is a security or safety event. For example, if the driver's speed indicates that he is frequently speeding, the server 230 may transmit a message to VCP 222 requesting the driver to slow down. The message may be output through vehicle 210's display or speakers.

As another example, if the data indicates that the driver is making too many stops or driving erratically, a message may be transmitted to VCP 222 requesting the driver to drive better or make less frequent stops. In some cases, if the driver is behind schedule, a message may be transmitted to VCP 222 to inform the driver that the driver is behind schedule. In general, various types of potential security, safety, and logistical events can be identified based on the data received from vehicle 210, and the server 230 may take one or more actions to respond to the events. In some implementations, if the user or server 230 determines that the vehicle 210 is being stolen or traveling in the wrong direction, the server 230 may send a message to VCP 222 instructing the VCP 222 to shut down the engine of vehicle 210 so that the vehicle 210 can no longer move.

In some implementations, to maintain cargo security, the VCP 222 may be configured to maintain a cargo lock from the time the vehicle 210 leaves the starting location until the time the vehicle arrives at the destination location. If the lock sensor 218 detects an opening of a cargo door during the trip from the starting location to the destination location, this opening may be interpreted as an unauthorized breach, and the server 230 may activate an alarm operation mode.

When an alarm operation mode is activated, the server 230 may take one or more actions. For example, if there is a possibility that the vehicle 210 is being stolen, the server 230 may activate a drone 228 to track the vehicle 210. The server 230 may also activate one or more cameras 226 that are in proximity of vehicle 210's location or along a likely route vehicle 210 may take. The server 230 may also generate and transmit instructions for components of vehicle 210 to execute one or more operations. One example, as described above, would be for the VCP 222 to shut down the engine of vehicle 210. Another example is to lock the driver and passenger cabin doors so that whoever is inside vehicle 210 cannot get out. Another example is to instruct optical sensor 212 and any other external optical sensor to capture images when an unauthorized opening of the cargo doors occurs. In some instances, if a weight sensor is deployed in the cargo area, and a weight change is detected in the cargo area, optical sensor 212 may be instructed to capture one or more images.

As can be appreciated from the foregoing, vehicle 210 may encounter various different scenarios before, during, and after a trip. The data provided from the sensors deployed in vehicle 210 may allow the user to monitor the vehicle 210, and any cargo inside vehicle 210, and take the appropriate measures in real-time or after the cargo has been delivered. For instance, if the cargo delivered at a destination is damaged, a user may review data from the starting location to the destination location, to determine how the cargo may have been damaged. Data from the trip can indicate, for example, whether the cargo was damaged due to erratic driving from the driver, whether the driver went off road, whether the cargo was dropped or mishandled, or if environmental conditions resulted in the damage.

While the systems and processes described above demonstrate how a particular vehicle's journey may be monitored, improved, and enhanced with the interactivity of multiple components of a vehicle with a monitoring system, the advantages of these systems and processes may be extended to other vehicles as well.

Figure 3:
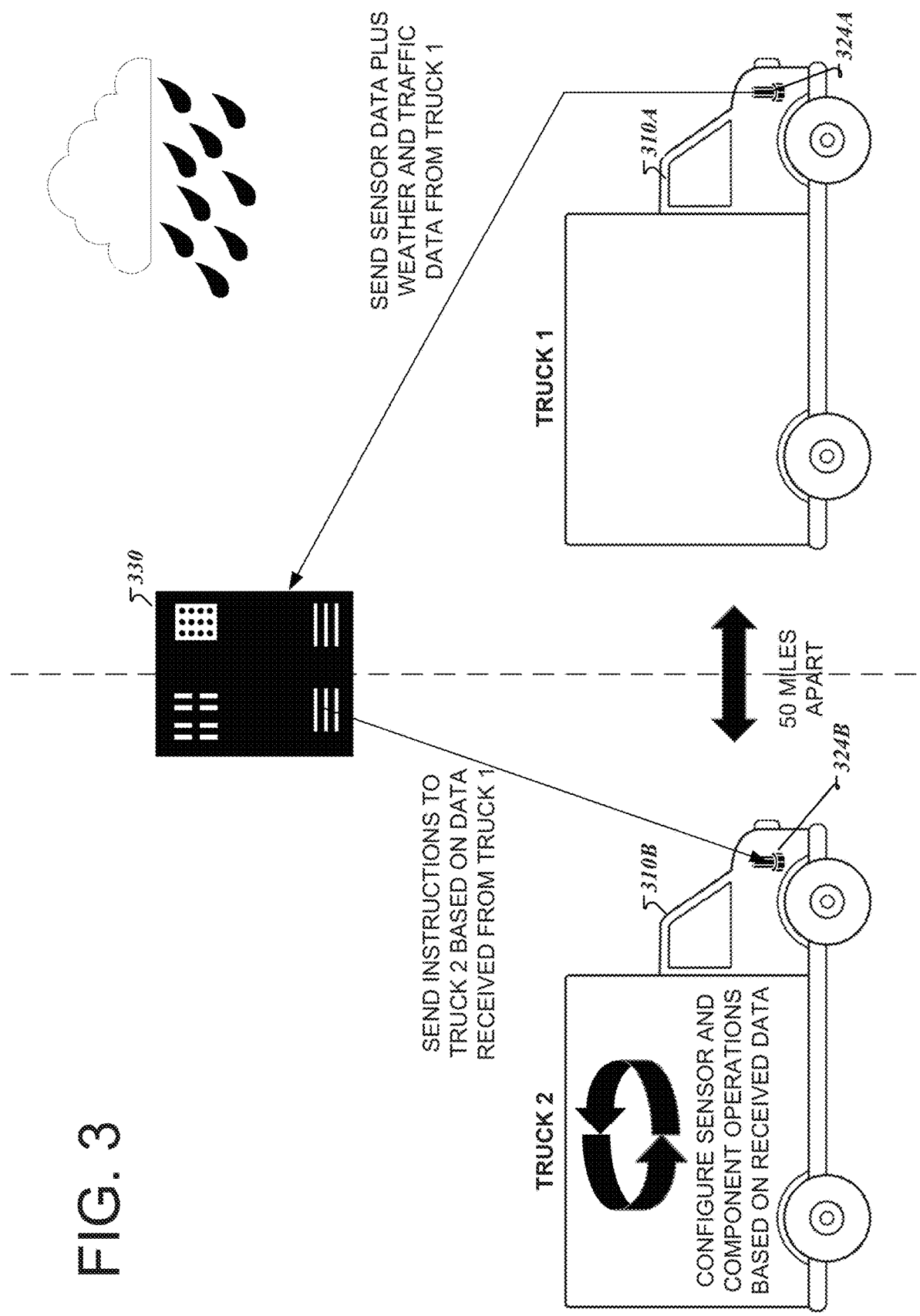
FIG. 3 depicts an example inter-vehicle communication.

FIG. 3 depicts an example inter-vehicle communication in which data collected from one vehicle 310A is used to facilitate another vehicle, vehicle 310B. Vehicles 310A and 310B may be equipped with the same sensors and components described above with respect to FIGS. 1 and 2. Vehicles 310A and 310B may be separated by a distance, for example, 50 miles, and may be traveling between the same starting location and destination location, with the same type of cargo.

Vehicle 310A may collect various types of data and send the collected data to the monitoring system server 330. For example, vehicle 310A may collect data indicative of weather and traffic conditions such as humidity, temperature, traffic, and average speed at various points along the route taken by vehicle 310A and in the cargo area of vehicle 310A. Additionally, vehicle 310A may provide data indicative of security or safety alarms such as images of suspects who may have stolen cargo from vehicle 310A or data indicative of how a theft at vehicle 310A may have occurred, e.g., data indicating an unauthorized opening of the cargo door or break in of a window.

Data collected for vehicle 310A may be received by monitoring system server 330 from vehicle 310A's transceiver 324A, and may be processed to generate instructions for vehicle 310B. For instance, using the data received from vehicle 310A, the server 330 may generate instructions for vehicle 310B to change its planned route to avoid traffic or to adjust its HVAC settings in anticipation of the likely change in the environmental conditions. In some cases, if safety or security related data such as images of potential suspects or data related to a theft is received from vehicle 310A, the monitoring system server 330 may provide image data of potential suspects or theft reports to vehicle 310B so that a driver of vehicle 310B may be alert to suspicious conditions and individuals when taking the same route as vehicle 310A. In general, various types of instructions may be generated and transmitted to vehicle 310B. A VCP in vehicle 310B receives the instructions and configures its sensors and components according to the instructions.

Although some operations have been described as being performed by one of a VCP, monitoring system server, or user, it should be understood that these operations may be performed, in general, by any of the VCP, monitoring system server, or user. For example, although the monitoring system server is described as receiving data from the VCP and activating an alarm operation mode, in some implementations, the VCP may process data received from the various components in a cargo vehicle, and trigger the activation of the alarm operation mode and transmit a notice to the server indicating that the alarm operation mode is being activated. Similarly, although some operations, such as identifying securities threats, have been described as being performed by a user, these operations may be performed by either the VCP or monitoring system server. In some implementations, the VCP or monitoring system server may utilize machine-learning methods and neural networks to enhance object detection, image processing, and classification techniques to identify security or safety events without requiring a user's input.

Figure 3A:
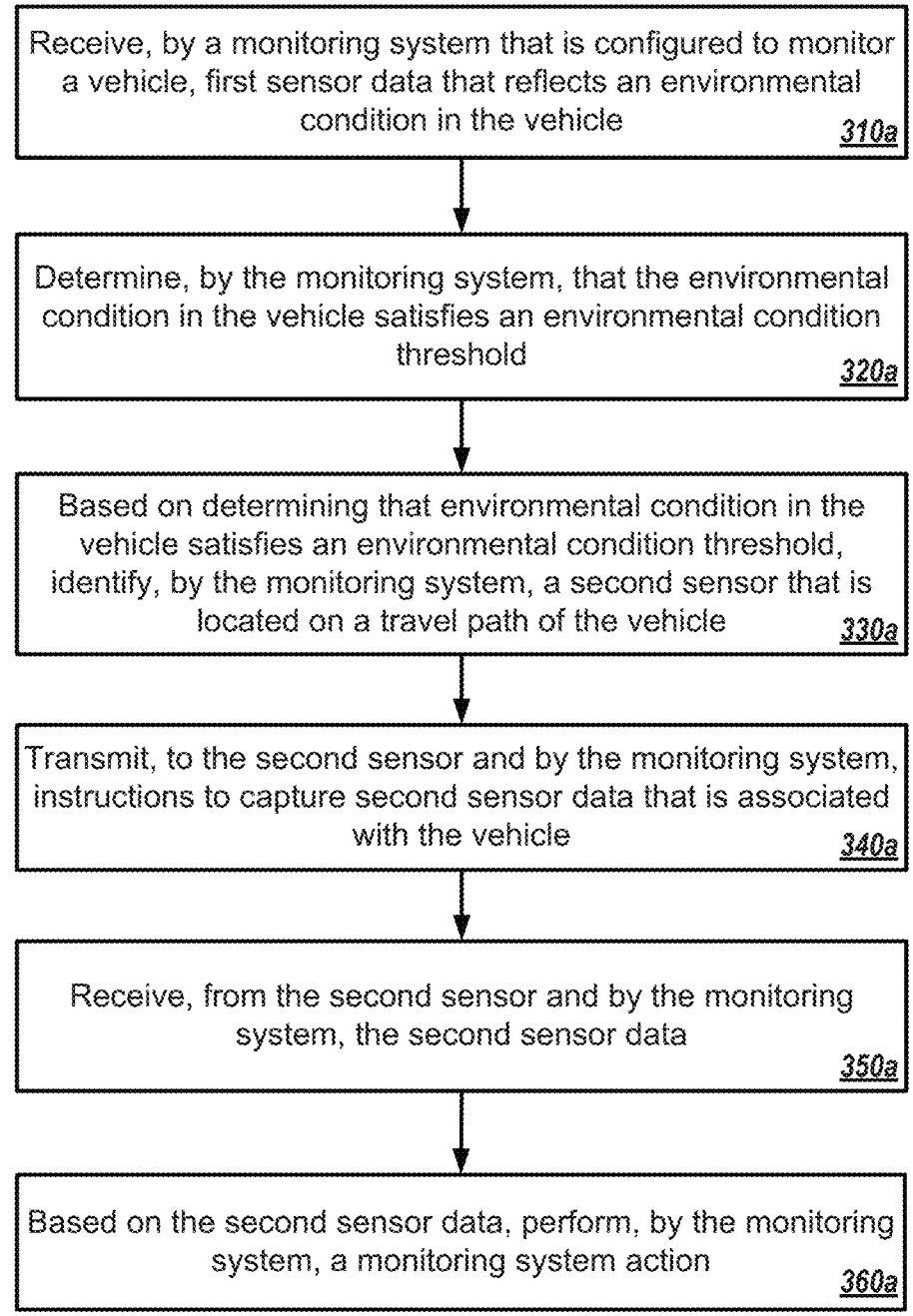
FIG. 3A depicts a flowchart of an example process for monitoring cargo of a vehicle.

FIG. 3A depicts a flowchart of an example process 300z for monitoring cargo of a vehicle. In general, the process 300a describes monitoring cargo of a vehicle while the vehicle is moving. The process 300a analyzes the sensor data from the vehicle to determine when the cargo may need additional monitoring. The process 300a identifies additional sensors on the path of the vehicle and access sensor data from those sensors as the vehicle passes through the sensors field of view. The process 300a will be described as being performed by a monitoring system comprising one or more computers, for example, the system 130 of FIG. 1, the system 230 of FIG. 2, the system 330 of FIG. 3, or the system 400 of FIG. 4. Each of the components of either system 130, 230, 330, or 400 may be included on a single computing device or distributed across multiple computing devices.

The monitoring system receives first sensor data that reflects an environmental condition in the vehicle (310a). The monitoring system determines that the environmental condition in the vehicle satisfies an environmental condition threshold (320a). The monitoring system, based on determining that environmental condition in the vehicle satisfies an environmental condition threshold, identifies a second sensor that is located on a travel path of the vehicle (330a). The monitoring system transmits, to the second sensor, instructions to capture second sensor data that is associated with the vehicle (340a). The monitoring system receives, from the second sensor, the second sensor data (350a). The monitoring system, based on the second sensor data, performs a monitoring system action (360a).

Figure 4:
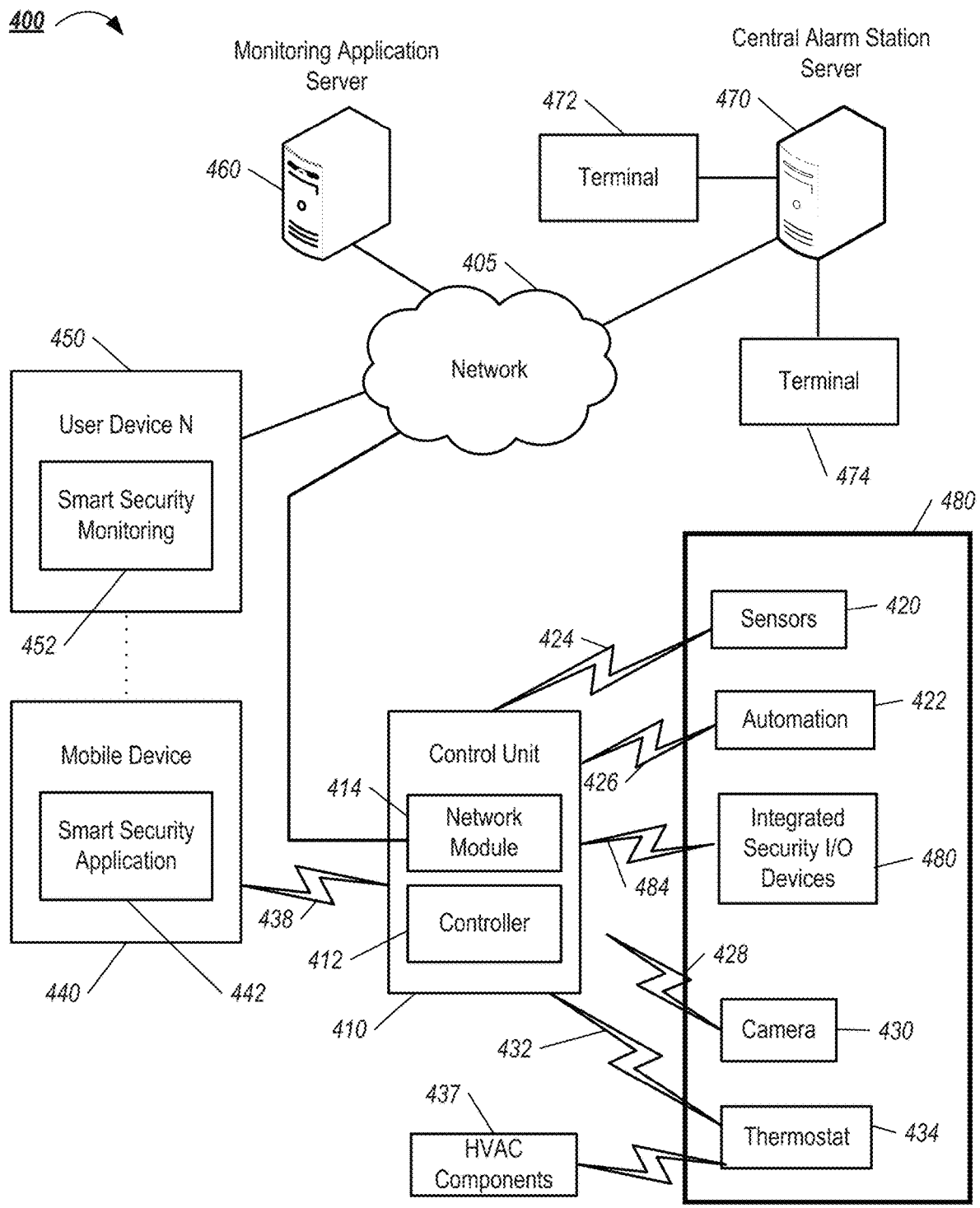
FIG. 4 is a block diagram of an example security monitoring system.

Embodiments and all of the functional operations and/or actions described in this specification may be implemented in the example security monitoring system 400 shown in FIG. 4. The electronic system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470. The operations associated with server 130 or 230 described above may be implemented in one or more of the monitoring application server 460 and the central alarm station server 470. The operations associated with the VCP described above may be implemented in part by control unit 410.

The network 405 is configured to enable exchange of electronic communications between devices connected to the network 405. For example, the network 405 may be configured to enable exchange of electronic communications, such as sensor data or network data, between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor such as the VCP described above or other control circuitry configured to execute instructions of a program that controls operation of a control unit system. In these examples, the controller 412 may be configured to receive input from sensors, flow meters, or other devices included in the control unit system and control operations of devices included in a vehicle (e.g., speakers, lights, doors, etc.). For example, the controller 412 may be configured to control operation of the network module 414 included in the control unit 410. The control unit 410 may be implemented in various manners and may be implemented in a single integrated unit or distributed across a network. For example, one or more parts of the control unit 410 may be implemented in a property 480 or at a network server.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voiceband modem configured to enable the alarm panel to communicate over the telephone lines of Plain Old Telephone Systems (POTS).

The control unit system that includes the control unit 410 includes one or more sensors 420. For example, the monitoring system may include multiple sensors 420. The sensors 420 may include a lock sensor, a contact sensor, a weight sensor, a motion sensor, or any other type of sensor included in a control unit system. The sensors 420 also may include an environmental sensor, such as a temperature sensor, a humidity sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag. In some cases, the sensors 420 may communicate directly or indirectly with one or more devices in network 405.

The control unit 410 communicates with the module 422 and the camera 430 to perform monitoring. The module 422 is connected to one or more devices that enable automation control. For instance, the module 422 may be connected to one or more lighting systems and may be configured to control operation of the one or more lighting systems. Also, the module 422 may be connected to one or more electronic locks at the property 480 and may be configured to control operation of the one or more electronic locks (e.g., control Z-Wave locks using wireless communications in the Z-Wave protocol). Further, the module 422 may be connected to one or more components at the property 480 and may be configured to control operation of the one or more components. The module 422 may include multiple modules that are each specific to the type of component being controlled in an automated manner. The module 422 may control the one or more components based on commands received from the control unit 410. For instance, the module 422 may cause a lighting system to illuminate an area to provide a better image of the area when captured by a camera 430.

In some implementations, module 422 is integrated into the control unit 410, e.g. as an internal component to the control unit. In this case, the module 422 is integrated into control unit 410 such that wired or wireless communication is not needed between 422 and 410. Communication path 426 would then become irrelevant in this implementation and the module 422 would communicate directly with the controller 412.

The camera 430 may be a video/photographic camera or other type of optical sensing device configured to capture images. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 may communicate directly with the monitoring application server 460 or a processing server over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property 480. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property 480 and/or environmental data at a property 480, e.g., at various locations indoors and outdoors at the property 480. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434.

A module 437 is connected to one or more components of an HVAC system associated with the property 480, and is configured to control operation of the one or more components of the HVAC system. In some implementations, the module 437 may be connected to the internal power grid of the property 480 and also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices. The robotic devices may be any type of robots that are capable of moving and taking actions that assist in security monitoring. For example, the robotic devices may include drones that are capable of moving to and within a property 480, such as a cargo vehicle, based on automated control technology and/or user input control provided by a user. In this example, the drones may be able to fly, roll, walk, or otherwise move to or about the property 480. The drones may include helicopter type devices (e.g., quad copters), rolling helicopter type devices (e.g., roller copter devices that can fly and also roll along the ground, walls, or ceiling) and land vehicle type devices (e.g., automated cars that move around a property 480). In some cases, the robotic devices may be robotic devices that are intended for other purposes and merely associated with the system 400 for use in appropriate circumstances. For instance, a robotic vacuum cleaner device may be associated with the monitoring system 400 as one of the robotic devices and may be controlled to take action responsive to monitoring system events.

In some examples, the robotic devices automatically navigate within a property 480. In these examples, the robotic devices include sensors and control processors that guide movement of the robotic devices within the property 480. For instance, the robotic devices may navigate within the property 480 using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect objects or other obstacles in the property 480 and guide movement of the robotic devices in a manner that avoids the objects and other obstacles.

In addition, the robotic devices may store data that describes attributes of the property 480. For instance, the robotic devices may store a three-dimensional model of the property 480 that enables the robotic devices to navigate the property 480. During initial configuration, the robotic devices may receive the data describing attributes of the property 480, determine a frame of reference to the data (e.g., a reference location in the property 480), and navigate the property 480 based on the frame of reference and the data describing attributes of the property 480. Further, initial configuration of the robotic devices also may include learning of one or more navigation patterns in which a user provides input to control the robotic devices to perform a specific navigation action (e.g., fly to a corner of the cargo vehicle and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property 480 and people in the property 480. The one or more biometric data collection tools may be configured to collect biometric samples of a person in the vehicle with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby person.

The robotic devices also may include a communication module that enables the robotic devices to communicate with the control unit 410, each other, and/or other devices. The communication module may be a wireless communication module that allows the robotic devices to communicate wirelessly. For instance, the communication module may be a Wi-Fi module that enables the robotic devices to communicate over a local wireless network at the property 480. The communication module further may be a 900 MHz wireless communication module that enables the robotic devices to communicate directly with the control unit 410. Other types of short-range wireless communication protocols, such as Bluetooth, Bluetooth LE, Zwave, Zigbee, etc., may be used to allow the robotic devices to communicate with other devices in the property 480.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predetermined locations. The robotic devices may be configured to navigate to the charging stations after completion of tasks needed to be performed for the monitoring system 400. For instance, after completion of a monitoring operation or upon instruction by the control unit 410, the robotic devices may be configured to automatically fly to and land on one of the charging stations. In this regard, the robotic devices may automatically maintain a fully charged battery in a state in which the robotic devices are ready for use by the monitoring system 400.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predetermined location may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property 480 that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices. Additionally, the one or more control units 410 may receive one or more sensor data from the sensors 420 and determine whether to provide an alert to the one or more integrated security input/output devices 480.

The sensors 420, the module 422, the camera 430, the thermostat 434, and the integrated security devices 480 may be deployed, installed, or affixed at a property 480, such as a cargo vehicle, and may communicate with the controller 412 over communication links 424, 426, 428, 432, 484, and 586. The communication links 424, 426, 428, 432, 484, and 586 may be a wired or wireless data pathway configured to transmit signals from the sensors 420, the module 422, the camera 430, the thermostat 434, and the integrated security devices 480 to the controller 412. The sensors 420, the module 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 484, and 586 may include a local network. The sensors 420, the module 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring application server 460 or processing server is an electronic device configured to provide monitoring services by exchanging electronic communications with the control unit 410, the one or more user devices 440 and 450, and the central alarm station server 470 over the network 405. For example, the monitoring application server 460 may be configured to monitor security or safety events generated by the control unit 410. In this example, the monitoring application server 460 may exchange electronic communications with the network module 414 included in the control unit 410 to receive information regarding security or safety events. The monitoring application server 460 also may receive information regarding events from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the control unit 410 or the one or more user devices 440 and 450. For example, the monitoring application server 460 may receive image data from the control unit 410 and run an image recognition process to determine the identity of people in an image included in the image data.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410 or monitoring application server 460. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. The one or more user devices 440 and 450 are devices that host and display user interfaces. For instance, the user device 440 is a mobile device that hosts one or more native applications. The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 may include a smart security application 442. The smart security application 442 refers to a software/firmware program running on the corresponding mobile device that enables the user-controlled features and interfaces described in this specification. The user device 440 may load or install the smart security application 442 based on data received over a network or data received from local media. The smart security application 442 runs on mobile devices platforms, such as iPhone, iPod touch, Blackberry, Google Android, Windows Mobile, etc. The smart security application 442 enables the user device 440 to receive and process image and sensor data from the monitoring system. The smart security application 442 may allow a user to view information regarding safety or security events and select one or more actions address the safety or security events.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart security monitoring interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Zwave, Zigbee, HomePlug (ethernet over powerline), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may, in some cases, communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a vehicle. In these implementations, the system 400 only includes the one or more user devices 440 and 450, the sensors 420, the module 422, the camera 430, and the robotic devices. The one or more user devices 440 and 450 receive data directly from the sensors 420, the module 422, the camera 430, and the robotic devices and sends data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices (or a component, such as a bridge/router) are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "Away" state, but set not to capture images when the alarm system is armed in a "Stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by the smart meter or other network components.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A monitoring system that is configured to monitor a vehicle, the monitoring system comprising:
   a first sensor that is configured to generate first sensor data that reflects an environmental condition in the vehicle;
   a location sensor that is configured to generate location data that reflects a geographical location of the vehicle;
   a processor that is configured to:
      receive the first sensor data and the location data;
      determine that the environmental condition in the vehicle satisfies an environmental condition threshold; and
      based on determining that environmental condition in the vehicle satisfies an environmental condition threshold, transmit, to a monitoring server, data indicating the location of the vehicle and the environmental condition in the vehicle; and
   the monitoring server that is configured to:
      receive the data indicating the location of the vehicle and the environmental condition in the vehicle;
      based on the location of the vehicle and the environmental condition in the vehicle, identify a second sensor that is located on a travel path of the vehicle;
      transmit, to the second sensor, instructions to capture second sensor data that is associated with the vehicle;
      receive, from the second sensor, the second sensor data; and
      based on the second sensor data, perform a monitoring system action.

2. The monitoring system of claim 1, wherein the first sensor is a humidity sensor, thermometer, lock sensor, camera, or microphone.

3. The monitoring system of claim 1, wherein the second sensor is a camera that is configured to capture image data of a property that is located on the travel path of the vehicle.

4. The monitoring system of claim 1, wherein:
   the second sensor is attached to an autonomous drone, and
   the instructions to capture second sensor data that is associated with the vehicle comprise instructions to navigate to a location of the vehicle.

5. The monitoring system of claim 1, wherein the monitoring server is configured to perform the monitoring system action by generating and transmitting a message indicating that environmental condition in the vehicle is within or is outside of a specified environmental condition range.

6. The monitoring system of claim 1, wherein the monitoring server is configured to perform the monitoring system action by generating and transmitting, to an additional vehicle, instructions to configure the additional vehicle for additional environmental conditions of the second sensor.

7. The monitoring system of claim 1, wherein:
   the processor is configured to determine that the environmental condition in the vehicle satisfies an environmental condition threshold by determining that a temperature inside the vehicle is equal to an outdoor temperature, and
   the monitoring server is configured to:
      transmit instructions to capture second sensor data that is associated with the vehicle by transmitting instructions to capture an image of the vehicle; and perform a monitoring system action by generating and transmitting a message that includes the image of the vehicle.

8. The monitoring system of claim 1, wherein the processor is configured to:
   determine that the environmental condition in the vehicle satisfies an environmental condition threshold by determining that a temperature of an inside of the vehicle is equal to an outdoor temperature;
   capture, using a camera located on the vehicle, an image of the inside of the vehicle; and
   transmit, to a monitoring server, the image of the inside of the vehicle.

9. A computer-implemented method, comprising:
   receiving, by a monitoring system that is configured to monitor a vehicle, first sensor data that reflects an environmental condition in the vehicle;
   determining, by the monitoring system, that the environmental condition in the vehicle satisfies an environmental condition threshold;
   based on determining that environmental condition in the vehicle satisfies an environmental condition threshold, identifying, by the monitoring system, a second sensor that is located on a travel path of the vehicle;
   transmitting, to the second sensor and by the monitoring system, instructions to capture second sensor data that is associated with the vehicle;
   receiving, from the second sensor and by the monitoring system, the second sensor data; and
   based on the second sensor data, performing, by the monitoring system, a monitoring system action.

10. The method of claim 9, wherein the first sensor is a humidity sensor, thermometer, lock sensor, camera, or microphone.

11. The method of claim 9, wherein the second sensor is a camera that is configured to capture image data of a property that is located on the travel path of the vehicle.

12. The method of claim 9, wherein:
   the second sensor is attached to an autonomous drone, and
   the instructions to capture second sensor data that is associated with the vehicle comprise instructions to navigate to a location of the vehicle.

13. The method of claim 9, wherein performing the monitoring system action comprises generating and transmitting a message indicating that environmental condition in the vehicle is within or is outside of a specified environmental condition range.

14. The method of claim 9, wherein performing the monitoring system action comprises generating and transmitting, to an additional vehicle, instructions to configure the additional vehicle for additional environmental conditions of the second sensor.

15. The method of claim 9, comprising:
   determining that the environmental condition in the vehicle satisfies an environmental condition threshold by determining that a temperature inside the vehicle is equal to an outdoor temperature;
   transmitting instructions to capture second sensor data that is associated with the vehicle by transmitting instructions to capture an image of the vehicle; and
   performing a monitoring system action by generating and transmitting a message that includes the image of the vehicle.

16. The method of claim 9, comprising:
   determining that the environmental condition in the vehicle satisfies an environmental condition threshold by determining that a temperature of an inside of the vehicle is equal to an outdoor temperature; and
   capturing, using a camera located on the vehicle, an image of the inside of the vehicle.

17. A non-transitory computer-readable medium storing software comprising instructions executable by one or more computers which, upon such execution, cause the one or more computers to perform operations comprising:
   receiving, by a monitoring system that is configured to monitor a vehicle, first sensor data that reflects an environmental condition in the vehicle;
   determining, by the monitoring system, that the environmental condition in the vehicle satisfies an environmental condition threshold;
   based on determining that environmental condition in the vehicle satisfies an environmental condition threshold, identifying, by the monitoring system, a second sensor that is located on a travel path of the vehicle;
   transmitting, to the second sensor and by the monitoring system, instructions to capture second sensor data that is associated with the vehicle;
   receiving, from the second sensor and by the monitoring system, the second sensor data; and
   based on the second sensor data, performing, by the monitoring system, a monitoring system action.

18. The medium of claim 17, wherein the first sensor is a humidity sensor, thermometer, lock sensor, camera, or microphone.

19. The medium of claim 17, wherein the second sensor is a camera that is configured to capture image data of a property that is located on the travel path of the vehicle.

20. The medium of claim 17, wherein:
   the second sensor is attached to an autonomous drone, and
   the instructions to capture second sensor data that is associated with the vehicle comprise instructions to navigate to a location of the vehicle.

* * * * *